(12) United States Patent
Venkataswami et al.

(10) Patent No.: US 10,986,213 B2
(45) Date of Patent: Apr. 20, 2021

(54) METHOD AND SYSTEM FOR STREAMING MANAGEMENT INFORMATION BASE DATA USING SIMPLE NETWORK MANAGEMENT PROTOCOL

(71) Applicant: GAVS Technologies Pvt. Ltd., Chennai (IN)

(72) Inventors: Balaji Venkat Venkataswami, Chennai (IN); Suri Parthasarathy, Chennai (IN); Chandramouleeswaran Sundaram, Chennai (IN); Ragavendran Selvaraj, Chennai (IN); Mohamed Ismail Ibrahim, Chennai (IN); Chandrasekar Balasubramanian, Chennai (IN)

(73) Assignee: GAVS Technologies Pvt. Ltd., Chennai (IN)

( * ) Notice: Subject to any disclaimer, the term of this patent is extended or adjusted under 35 U.S.C. 154(b) by 0 days.

(21) Appl. No.: 16/416,086

(22) Filed: May 17, 2019

(65) Prior Publication Data
US 2020/0244773 A1 Jul. 30, 2020

(30) Foreign Application Priority Data

Jan. 30, 2019 (IN) .............................. 201941003767

(51) Int. Cl.
*H04L 29/08* (2006.01)
*H04L 29/06* (2006.01)
(Continued)

(52) U.S. Cl.
CPC .......... *H04L 67/34* (2013.01); *G06F 16/1744* (2019.01); *H04L 41/0213* (2013.01); *H04L 69/16* (2013.01)

(58) Field of Classification Search
CPC ..... H04L 67/34; H04L 41/0213; H04L 69/16; G06F 16/1744
See application file for complete search history.

(56) References Cited

U.S. PATENT DOCUMENTS

| | | | | | |
|---|---|---|---|---|---|
| 5,651,006 | A | * | 7/1997 | Fujino | H04L 41/0213 370/408 |
| 6,003,077 | A | * | 12/1999 | Bawden | H04L 41/0213 709/223 |

(Continued)

*Primary Examiner* — Blake J Rubin
(74) *Attorney, Agent, or Firm* — Convergence Intellectual Property Law P.C.; Jonathan Garfinkel

(57) ABSTRACT

A method and system for streaming management information base data using simple network management protocol is disclosed. The system includes a manager device and an endpoint device, which runs a SNMP agent and SNMP proxy. The SNMP proxy retrieves MIB data from the SNMP Agent associated with the endpoint device, wherein the MIB data comprises a full MIB sub-tree and differential MIB sub-trees. MIB views comprising MIB variables of interest associated with a full MIB sub-tree and differential MIB sub-trees are created based on a predetermined configuration. The SNMP proxy stores the MIB views and corresponding MIB data in a data store and compresses the MIB views and MIB data into files. Compressed file of the MIB view with MIB data associated with full MIB sub-tree are sent to the manager device in an initial stream. Further, the endpoint device streams compressed file of the MIB views with MIB data associated with the differential MIB sub-tree to the manager device on receiving a request.

21 Claims, 7 Drawing Sheets

(51) Int. Cl.
*H04L 12/24* (2006.01)
*G06F 16/174* (2019.01)

(56) References Cited

U.S. PATENT DOCUMENTS

| | | | | |
|---|---|---|---|---|
| 6,104,868 | A * | 8/2000 | Peters | H04L 41/022 709/202 |
| 6,182,157 | B1 * | 1/2001 | Schlener | H04L 41/0213 709/202 |
| 6,317,748 | B1 * | 11/2001 | Menzies | H04L 41/0213 |
| 6,389,464 | B1 * | 5/2002 | Krishnamurthy | H04L 41/0213 709/220 |
| 6,430,613 | B1 * | 8/2002 | Brunet | H04L 41/044 709/223 |
| 6,470,384 | B1 * | 10/2002 | O'Brien | H04L 41/0213 707/999.01 |
| 6,546,415 | B1 * | 4/2003 | Park | H04L 41/0213 709/202 |
| 6,549,943 | B1 * | 4/2003 | Spring | H04L 41/0213 709/201 |
| 6,650,347 | B1 * | 11/2003 | Nulu | H04L 67/36 700/83 |
| 6,718,137 | B1 * | 4/2004 | Chin | H04L 41/0213 398/3 |
| 6,728,768 | B1 * | 4/2004 | Carney | H04L 41/0213 707/999.2 |
| 6,788,315 | B1 * | 9/2004 | Kekic | H04L 41/0681 709/203 |
| 7,143,159 | B1 * | 11/2006 | Grace | H04L 41/0213 709/224 |
| 7,254,781 | B1 * | 8/2007 | Land | H04L 12/2856 715/760 |
| 7,263,597 | B2 | 8/2007 | Everdell | H04L 47/10 709/201 |
| 7,305,461 | B2 * | 12/2007 | Ullman | H04L 41/12 370/354 |
| 7,328,260 | B1 * | 2/2008 | Muthiyan | H04L 41/0681 709/220 |
| 7,490,073 | B1 * | 2/2009 | Qureshi | G06F 11/079 706/50 |
| 7,822,836 | B1 * | 10/2010 | Saparoff | H04L 41/0233 709/223 |
| 8,019,849 | B1 * | 9/2011 | Lopilato | G06F 16/1827 709/223 |
| 8,244,843 | B1 * | 8/2012 | Primerano | H04L 41/022 709/223 |
| 10,097,400 | B1 * | 10/2018 | Tandon | G06F 16/951 |
| 2002/0016827 | A1 * | 2/2002 | McCabe | G06F 11/2069 709/213 |
| 2002/0112182 | A1 * | 8/2002 | Chang | G06F 11/3495 726/6 |
| 2003/0086425 | A1 * | 5/2003 | Bearden | H04M 3/2236 370/392 |
| 2003/0097438 | A1 * | 5/2003 | Bearden | H04L 41/12 709/224 |
| 2004/0153966 | A1 * | 8/2004 | Richmond | G06F 40/177 715/228 |
| 2004/0264484 | A1 * | 12/2004 | Kui | H04L 43/0817 370/402 |
| 2006/0047801 | A1 * | 3/2006 | Haag | H04L 41/0213 709/223 |
| 2007/0186011 | A1 * | 8/2007 | Batke | H04L 41/0213 709/246 |
| 2007/0276932 | A1 * | 11/2007 | Sankaran | H04L 43/10 709/223 |
| 2008/0140822 | A1 * | 6/2008 | Torii | H04L 41/12 709/223 |
| 2008/0201468 | A1 * | 8/2008 | Titus | H04L 43/0829 709/224 |
| 2010/0091676 | A1 * | 4/2010 | Moran | H04L 47/762 370/252 |
| 2010/0103824 | A1 * | 4/2010 | Gilmour | H04L 43/0817 370/245 |
| 2011/0239058 | A1 * | 9/2011 | Umezuki | H04L 41/06 714/48 |
| 2011/0270966 | A1 * | 11/2011 | Zhou | H04L 41/0213 709/224 |
| 2011/0295989 | A1 * | 12/2011 | Kiyoto | H04L 41/0266 709/223 |
| 2012/0030327 | A1 * | 2/2012 | Conrad | H04L 41/0213 709/223 |
| 2012/0084432 | A1 * | 4/2012 | Soprovich | H04L 41/069 709/224 |
| 2012/0239793 | A1 * | 9/2012 | Veerabhadrappa | H04L 41/0233 709/223 |
| 2013/0339503 | A1 * | 12/2013 | Annamalaisami | H04L 41/042 709/223 |
| 2015/0081878 | A1 * | 3/2015 | Pabba | H04L 41/0806 709/224 |
| 2015/0338906 | A1 * | 11/2015 | Sato | G06F 3/1236 713/323 |
| 2017/0052978 | A1 * | 2/2017 | Gupta | H04L 41/0213 |
| 2018/0375953 | A1 * | 12/2018 | Casassa Mont | H04L 61/2015 |

* cited by examiner

METHOD AND SYSTEM FOR STREAMING MANAGEMENT INFORMATION BASE DATA USING SIMPLE NETWORK MANAGEMENT PROTOCOL

CROSS REFERENCE TO RELATED APPLICATIONS

This application claims priority to Indian patent application No. 201941003767, filed on 30 Jan. 2019, the full disclosure of which is incorporated herein by reference.

FIELD OF THE INVENTION

The disclosure relates generally to wired and wireless communication networks and, more specifically but not exclusively relates to methods and systems for streaming management information base data using simple network management protocol.

DESCRIPTION OF THE RELATED ART

Management of computer networks, such as local area networks, involves maintenance and administration of hardware or software resources. Generally, network management may involve various processes like monitoring, controlling, detecting, predicting, and coordination, associated with the resources. Other functions and tasks, such as network configuration, bandwidth allocation, data routing, load balancing, security, reliability and performance monitoring, fault detection, and the like, may also be involved.

Various protocols are implemented to perform the network management functions. Some of the existing protocols include simple network management protocol (SNMP) in wired and wireless networks, common management information protocol (CMIP) in telecommunication networks, common management information protocol over TCP/IP (CMOT), web based enterprise model (WBEM), and the like. In spite of development of numerous protocols, there exist certain challenges associated with managing wired and wireless networks.

For instance, SNMP is a mechanism using which a manager end-station can monitor multiple devices in a network. The devices include routers, switches and end-hosts, such as servers, laptops and even small form factor devices. Conventionally, manager end-station poll the network devices using commands, such as snmp-get, snmp-get-next, snmp-get-bulk for read-only information and use the snmp-set procedures to set values on these monitored devices. The monitored network devices include an agent to fetch the management information base (MIB) values using operating system dependent procedure calls and application programming interfaces (APIs), which help to report the data to the MIB implementation code. This polling process is very tedious as the manager has to poll each of the monitored devices and fetch the values and then evaluate them and process them Further, the distance between manager end-station and the monitored network devices could lead to latency. For example, the requests, response, and traffic, to and from the device may traverse the entire network if the manager end-station and the monitored devices are located very far from each other on the network. In some instances, the data polled does not change over time, which leads to inefficient use of network and end-point bandwidth, and polling time. Moreover, CPU cycles on manager end-stations could also be wasted depending on whether the polled data changes over time or not. This could lead to inordinate operation of the manager end-station. Additionally, polling intervals may overlap if large numbers of devices are under management.

Various publications have attempted to address some of the challenges associated with network management as described above. For instance, WO2018236555A1 discloses monitoring cloud computing environments with data control policies and simple network management protocol. US20060047801A1 discloses SNMP wireless proxy for efficient network management in wireless environments. CN105681084A discloses system and method for creating SNMP monitoring agent daemon. However, these references do not solve the aforementioned drawbacks in SNMP polling.

SUMMARY OF THE INVENTION

The present subject matter relates to methods and systems for streaming management information base data using simple network management protocol.

According to one embodiment of the present subject matter, a method of streaming Management Information base (MIB) data using Simple Network Management Protocol (SNMP) is provided. The method includes receiving, by a plurality of endpoint devices, an authentication request from a manager device. Next, an authentication response is sent by each of the plurality of endpoint devices to the manager device, wherein the authentication response indicates an approval for communication. MIB views associated with MIB data are created at each endpoint device based on a predetermined configuration, wherein the MIB views comprises MIB variables of interest. The method then includes retrieving MIB data associated with the endpoint device based on the MIB variables of interest, wherein the MIB data comprises a full MIB sub-tree and differential MIB sub-trees. The method next involves storing the MIB views with the corresponding MIB data on a local data store at each endpoint device. The MIB views along with the corresponding MIB data associated with full MIB sub-tree and differential MIB sub-trees are compressed into files. The compressed file of the MIB view associated with full MIB sub-tree is sent to the manager device in an initial stream. Further, the method includes receiving, by the endpoint device, requests for updated MIB views from the manager device; and streaming compressed file of the MIB views with the corresponding MIB data associated with the differential MIB sub-tree to the manager device.

In various embodiments, the full MIB-sub-tree comprises all MIB data associated with the endpoint device and the differential MIB-sub-tree comprises differences in the full MIB sub-tree over different time period. The method further comprises receiving the predetermined configuration from the manager device prior to creating MIB views. The method further comprises determining a differential MIB-sub-tree by differentiating full MIB-sub-tree obtained at $t_n$ from the full MIB-sub-tree obtained at $t_{n-1}$. The method further comprises streaming compressed file of MIB views with the corresponding MIB data associated with the full MIB sub-tree in response to receiving a request for updated MIB views comprising MIB variables of interest for full MIB sub-tree from the manager device. The method further comprises streaming compressed files of both MIB views with the corresponding MIB data associated with the full MIB-sub-tree and differential MIB-sub-tree in a predetermined sequence, wherein the predetermined sequence is provided by the manager device. The method further comprises streaming compressed file of MIB views with corresponding MIB data associated with the full MIB sub-tree to the manager device in response to the occurrence of an event, wherein the event is an SNMP Trap. The method further comprises encrypting the compressed file prior to streaming the compressed file associated with the MIB views with corresponding MIB data of differential MIB sub-tree. In some embodiments, transport mechanism used in the streaming comprises one of UDP or TCP. In various embodiments, the local data store stores the MIB views with the latest MIB data retrieved. Further, in various embodiments, the request for MIB views from the manager device comprises one or more MIB variables of interest.

According to another embodiment of the present subject matter, a system for streaming Management Information base (MIB) data using Simple Network Management Protocol (SNMP) is provided. The system includes a manager device configured to manage devices over a network; a plurality of endpoint devices connected to the network. The endpoint devices comprise: a processing unit; a memory unit comprising a plurality of modules to be executed by the processing unit, wherein the plurality of modules comprises: an authentication module, an SNMP agent module, an SNMP proxy module. The authentication module is configured to: receive an authentication request from the manager device; and send an authentication response to the manager device, wherein the authentication response indicates an approval for communication. The SNMP proxy module is configured to: create MIB views based on a predetermined configuration, wherein the MIB views comprises MIB variables of interest; retrieve MIB data for the MIB variables of interest from SNMP agent module associated with the endpoint device, wherein the MIB data comprises a full MIB sub-tree and differential MIB sub-trees. The SNMP proxy module is configured to: store the MIB views with the corresponding MIB data on a local data store at each endpoint device, wherein the local data store is configured to store the MIB views with corresponding MIB data periodically; compress the MIB views with corresponding MIB data associated with full MIB sub-tree and differential MIB sub-trees into files; send the MIB views with corresponding MIB data associated with full MIB sub-tree to the manager device in an initial stream; receive requests for updated MIB views from the manager device; and stream the compressed file of the MIB views with corresponding MIB data associated with the differential MIB sub-tree to the manager device.

In various embodiments, the manager device comprises a display unit for displaying the streamed MIB views with MIB data and a processor unit for processing the received data. In various embodiments, the memory unit of the manager device includes a receiver proxy module configured to receive and store the SNMP data streamed from the SNMP proxy of the endpoint device. The memory unit of the manager device includes management module configured to generate charts and graphs associated with MIB data in the MIB views. The SNMP proxy module is configured to encrypt the compressed file prior to streaming the MIB views with corresponding MIB data of full and differential MIB sub-tree. The full MIB-sub-tree comprises all MIB data associated with the endpoint device and the differential MIB-sub-tree comprises differences in the full MIB sub-tree over different time period. The SNMP proxy module is configured to determine a differential MIB-sub-tree by differentiating full MIB-sub-tree obtained at $t_n$ from the full MIB-sub-tree obtained at $t_{n-1}$ The SNMP proxy module is configured to stream compressed files of MIB views with corresponding MIB data associated with the full MIB sub-tree in response to receiving a request for full MIB sub-tree from the manager device. The SNMP proxy module is configured to stream compressed files of both MIB views with corresponding MIB data associated with the full MIB-sub-tree and differential MIB-sub-tree in a predetermined sequence, wherein the predetermined sequence is provided by the manager device. In various embodiments, the SNMP proxy module receives the request for the MIB views from the manager device, the request including one or more MIB variables of interest.

This and other aspects are disclosed herein.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE EMBODIMENTS

Figure 1:
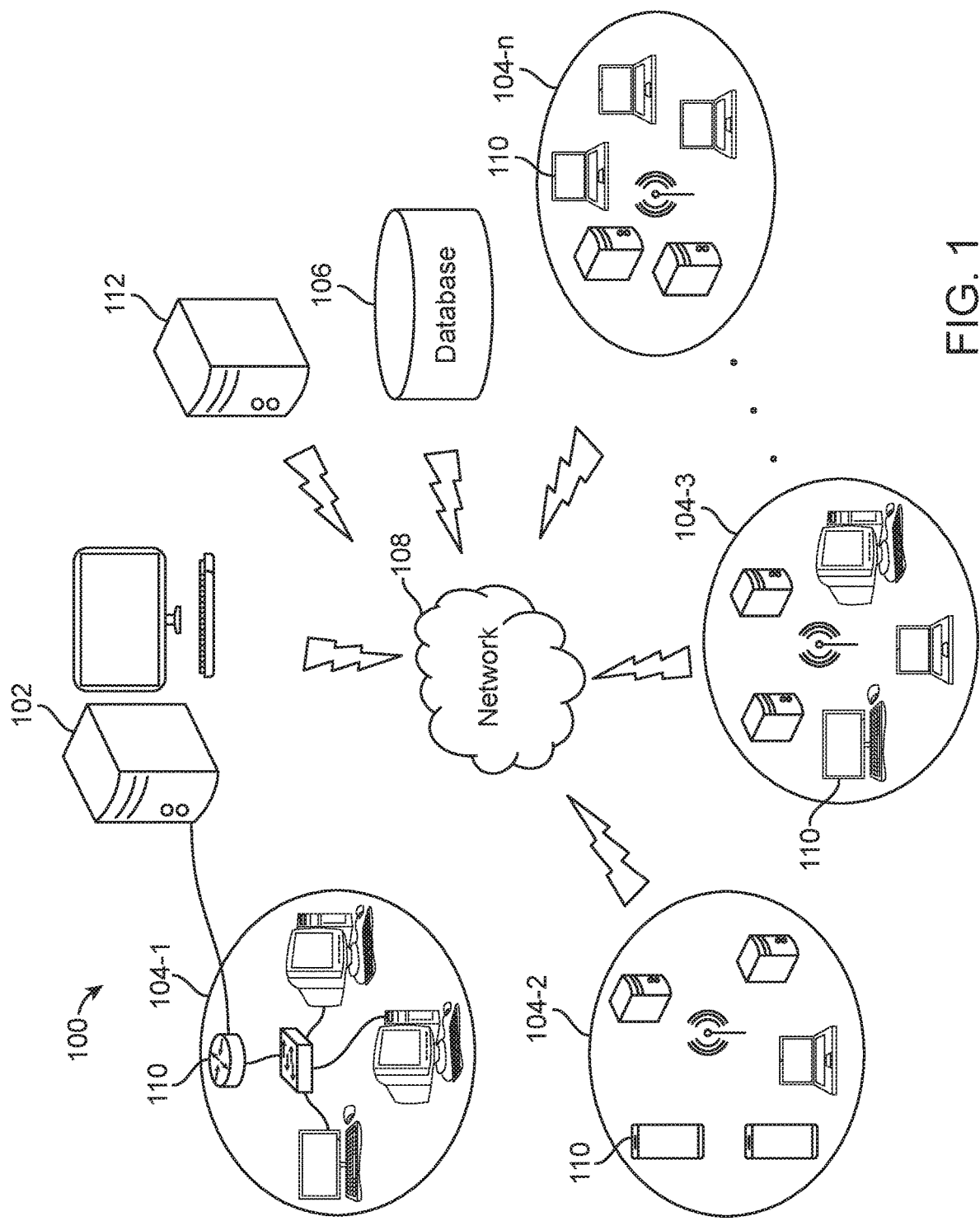
FIG. 1 illustrates a system environment for streaming management information base data using simple network management protocol, according to one embodiment of the present subject matter.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on". Referring to the drawings, like numbers indicate like parts throughout the views. Additionally, a reference to the singular includes a reference to the plural unless otherwise stated or inconsistent with the disclosure herein.

The various architectural components of the present invention may be distributed across various special purpose or general purpose computing devices, including various hardware components, such as personal computers, servers, laptops, hand-held devices, cell phones or the like, as discussed in greater detail below.

The term "computing device" encompasses devices, such as servers, desktop computers, laptop computers, tablet computers, personal digital assistants (PDA), smartphones, mobile phones, smart devices, appliances, sensors, or the like. The computing devices may include processing units, memory units, video or display interfaces, input/output interfaces, video or audio recording units, buses that connect the various units, network interfaces, peripheral interfaces, and the like. It may include any client device or a series thereof that may perform the desired computing operation and may include "rich" devices that are capable of performing a high degree of data processing, such as desktop personal computers (PCs) and "thin" clients that are less capable of processing data, such as cellular phones and pagers. It is understood that the distinction between a rich client and a thin client is a spectrum; there are many devices (hand-held or Tablet PCs) for example, that fall in the middle of the spectrum. Regardless of the device type or the processing capability of the client, most client devices may be operated by a user in either an online or offline state.

The invention in its various embodiments proposes an asynchronous polling method in simple network management protocol. The present subject matter includes a method and system for streaming management information base data using simple network management protocol.

A system environment for streaming management information base (MIB) data using simple network management proxy (SNMP) is illustrated in FIG. 1, according to one embodiment of the present subject matter. The environment 100 primarily includes a manager device 102, one or more local networks 104-1, 104-2, . . . , 104-n, a database 106, and a central server 112 communicating with each other over a network 108. The local networks 104-1, 104-2, 104-3, . . . , 104-n may include a plurality of endpoint devices 110. In various embodiments, a plurality of manager devices 102 may be locally incorporated in the local networks 104-1, 104-2, 104-3, . . . , 104-n. Alternatively, the manager device 102 may be deployed centrally in the network 108 as well as locally in the local area networks 104-1, 104-2, 104-3, . . . , 104-n.

Each local network 104 may not necessarily be located in the same location. However, they may be located in a close proximity. For example, each local network 104 here may refer to networks established in different organizations in a business cluster, which may be an agglomeration of one or more of companies or business units such as manufacturing-related companies, services-related companies, or IT companies.

In various embodiments, the units 102, 104, 106, 112 and other components in FIG. 1 may be computing devices, such as servers, desktop computers, laptop computers, tablet computers, personal digital assistants (PDA), smartphones, mobile phones, smart devices, appliances, sensors, or the like. The computing devices may include processing units, memory units, network interfaces, peripheral interfaces, and the like. Some or all of the components may comprise or reside on separate computing devices or on the same computing device.

In various embodiments, the central server 112 may facilitate an online platform that may manage multiple manager devices, which are configured to independently manage one or more local networks. In various embodiments, networks may refer generally to any type of data or telecommunication network including, without limitation, data networks, such as LANs, WANs, WLANs, MANs, internets, intranets, satellite networks, telco networks, and the like. Such networks or portions thereof may utilize any one or more different topologies, such as bus, star, ring, loop, etc., over different transmission media, such as wired/RF cable, RF wireless, millimeter wave, optical, etc.).

In some embodiments, the devices may be configured to utilize various communication protocols, such as Worldwide Interoperability for Microwave Access (WiMAX), 5G, 5G-New Radio, High Speed Packet Access (HSPA), Long Term Evolution (LTE), Global System for Mobile Communications (GSM), General Packet Radio Services (GPRS), Enhanced Data GSM Environment (EDGE), Code Division Multiple Access (CDMA), Wideband Code Division Multiple Access (WCDMA), Bluetooth, and the like. In other embodiments, various communications or networking protocols including, but not limited to, 3GPP, 3GPP2, WAP, DOCSIS, IEEE Std. 802.3, ATM, X.25, SONET, Frame Relay, SIP, TCP/UDP, FTP, RTP/RTCP, H.323, and the like, may also be used.

Figure 2:
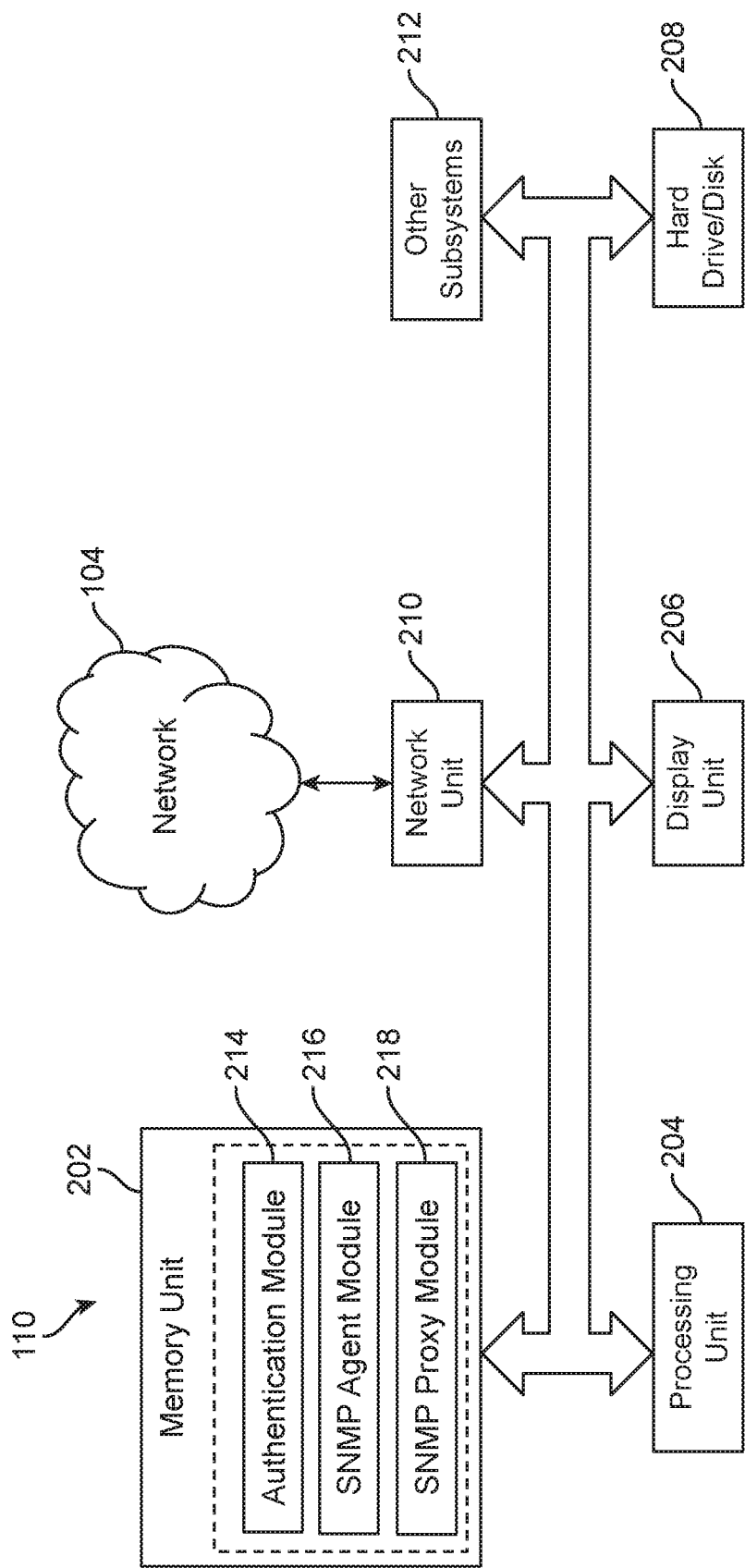
FIG. 2 illustrates an architecture diagram of the endpoint device, according to one embodiment of the present subject matter.

An architecture diagram of the endpoint devices 110 is illustrated in FIG. 2, according to one embodiment of the present subject matter. Each endpoint device 104 includes a memory unit 202, processing unit 204, display unit 206, hard disk 208, network unit 210, and other subsystems 212. The memory unit 202 includes a plurality of modules including an authentication module 214, an SNMP agent module 216, and an SNMP proxy module 218. In various embodiments, the modules may be implemented as software to be executed by the processing unit 204. The software may include a series of instructions or commands stored in the memory unit 202.

The authentication module 214 may be configured to receive an authentication request from the manager device 102. Based on the authentication request, the authentication module creates an authentication response, which is transmitted to the manager device 102. The authentication response may indicate an approval for communication leading to establishment of communication between the manager device 102 and the endpoint device 110. In various embodiments, the authentication request format may vary based on the version of SNMP. The SNMP versions may be any of the existing versions including, but not limited to, SNMP v1, SNMP v2, SNMP v2c, SNMP v3, etc.

The SNMP agent module 216 is configured to fetch MIB values using operating system dependent procedure calls and application programming interfaces which help to report the data to the MIB implementation code. The agent module stores these values in a MIB database and responds to queries to return values of MIB variables. It is coupled to SNMP proxy module 218 which queries the agent periodically and sends initially parts of the whole MIB and from on just the changes (streaming) that occur to the MIB variables on the device.

The SNMP proxy module 218 may be configured to create MIB views based on a predetermined configuration. The MIB views may specify the MIB variables based on which MIB data is retrieved. Next, the MIB data associated with the endpoint device may be retrieved. The MIB data may include object information associated with the endpoint device 104. Each MIB variable of interest and its MIB data is addressed or identified using an object identifier (OID), which is often a device's setting or status. The OID uniquely identifies a managed object in the MIB hierarchy and each managed object is made up of one or more variables called object instances, which are also identified by OIDs. The MIB may be organized hierarchically and depicted as a tree. In some embodiments, the retrieved MIB data comprises a full MIB sub-tree and differential MIB sub-trees. Full MIB sub-trees may depict the whole MIB tree structure and the differential MIB sub-tree may depict partial tree structure.

The SNMP proxy module 218 may be configured to store the MIB views along with their MIB data on a local data store at respective endpoint device. The local data store may be an independent memory unit, such as random access memory, for allowing MIB data to be read and written is almost same amount. The local data store may store the MIB views with the MIB data in response to execution of the SNMP proxy. The SNMP proxy module 218 may also be configured to compress the MIB views with the MIB data associated with full MIB sub-tree and differential MIB sub-trees into files and then send the MIB views along with MIB data associated with full MIB sub-tree to the manager device 102 in an initial stream. Further, the SNMP proxy module 218 may receive requests for updated MIB views with MIB data from the manager device 102 and in response to the requests, the SNMP proxy module 218 may stream the compressed file of the MIB views and the corresponding MIB data associated with the differential MIB sub-tree to the manager device 102. The MIB views and corresponding MIB data may be translated into a format compatible for display at the manager device 102.

Figure 3:
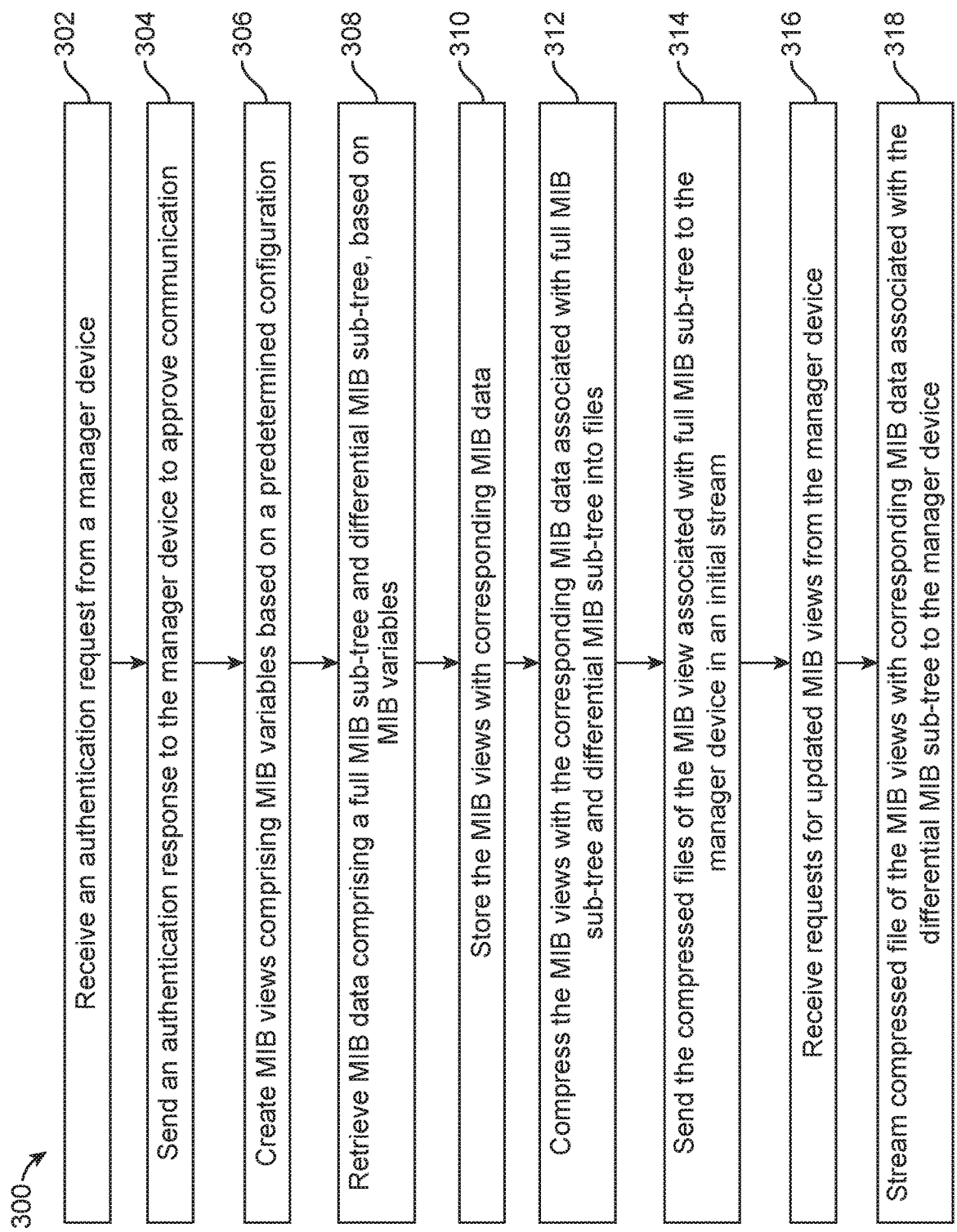
FIG. 3 illustrates a method of streaming management information base data using simple network management protocol, according to one embodiment of the present subject matter.

The streaming method 300 is illustrated in FIG. 3, according to an embodiment of the present subject matter. The method 300 includes receiving an authentication request from a manager device by plurality of endpoint devices at block 302. The plurality of endpoint devices are installed with an SNMP agent and a SNMP proxy. An authentication response is transmitted by the plurality of endpoint devices to the manager device at block 304. The authentication response may indicate an approval or rejection for communication. The authentication between the manager device and the endpoint device may be performed periodically.

Views of MIBs consisting of MIB variables of interest which are required to be streamed are created at each endpoint device based on a predetermined configuration at block 306. The predetermined configuration may also determine the sequence or pattern the MIB sub-trees to be received by the manager device. The MIB data associated with the endpoint device is retrieved based on the MIB variables at block 308. The MIB data may include full MIB sub-tree and differential MIB sub-trees.

The method next involves storing the MIB views along with the MIB data on a local data store at each endpoint device at block 310. The local data store is configured to store the MIB views and the corresponding MIB data on subsequent execution of the SNMP proxy. The MIB views and the MIB data associated with full MIB sub-tree and differential MIB sub-trees are compressed into files at block 312. The compressed file of the MIB view and the MIB data associated with full MIB sub-tree is sent to the manager device in an initial stream at block 314. In various embodiments, the MIB view may include timestamp indicating the time at which the MIB data was retrieved. The manager device may use the full MIB sub-tree for performing network management functions, such as network configuration, bandwidth allocation, traffic routing and load balancing, security, reliability and performance monitoring, fault detection, and the like.

Further, the method includes receiving, by the endpoint device, requests for updated MIB views consisting of MIB variables of interest from the manager device, at block 316. The requests from the manager device may be received at a different time to detect changes in the MIB data. The compressed files of the MIB views with the MIB data associated with the differential MIB sub-tree are streamed to the manager device at block 318. The differential MIB sub-tree exclusively indicates the changes to the MIB data only.

Figure 4:
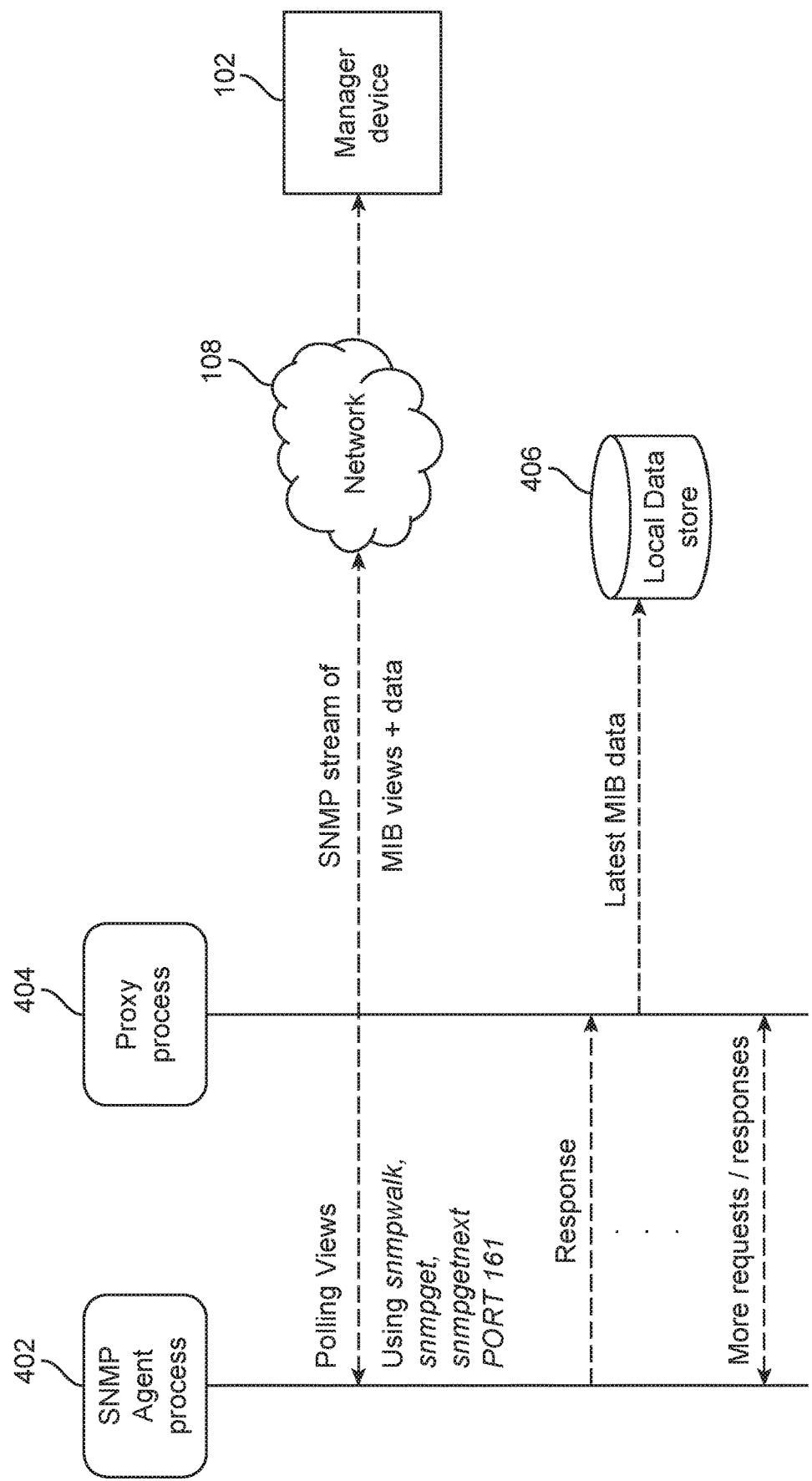
FIG. 4 illustrates a SNMP streaming diagram, according to one embodiment of the present subject matter.

The SNMP streaming process is further illustrated in FIG. 4, according to one embodiment of the present subject matter. The process involves using SNMP Agent process 402, on the endpoint device. As known in the art, software packages, such as net-snmp, enable locating a process in the endpoint running the SNMP agent that acts as a poller within the endpoint. In addition, a process called the SNMP-M-Proxy 404 (M stands for Management) may be created on the device itself. The SNMP proxy may use a local data store 406, such as flat files.

The SNMP-M-Proxy 404 polls SNMP agent locally using snmpwalk, snmpget, snmpgetnext, which are freely available in the open source as part of packages like net-snmp. It is important to note that the SNMP Request is local and the SNMP Response is local (originating and ending at the endpoint itself). The local data store 406 stores the latest information polled as a result of the running of the SNMP-M-Proxy. On each run the latest data is retrieved using snmpwalk and the previous version polled is differentiated between the former and the later and only latest changes are diffed or compared, differences generated and maintained.

Further, views consisting of MIB variables of interest may be created on the MIB tree. In various embodiments, the configuration of the SNMP-M-Proxy 404 may either snmpwalk the entire MIB tree from top to bottom or poll for specific sub-branches of the MIB tree. Hence, the entire MIB tree need not be polled. The predetermined configuration of the views may be provided from the remote manager device in the initial stages. In various embodiments, the views information may be updated at a later stage as well and from time to time as is necessary and as the need arises.

The local polling depends on view MIB elements as requested from the manager device. Only latest changes in the views requested may be streamed to the device, except for the first time when the entire view data is shipped. In some embodiments, the manager device (102) may request for MIB views by specifying one or MIB variables of interest. In some embodiments, views information may be provided such that an entire sub-tree of the MIB tree structure are shipped across to the manager device periodically. Therefore, the views contain certain MIB trees that are diffed and streamed across while other MIB sub-trees are shipped across in total from the start of the sub-tree to the end of the sub-tree. The resulting stream may be based on UDP or TCP or both.

Figure 5:
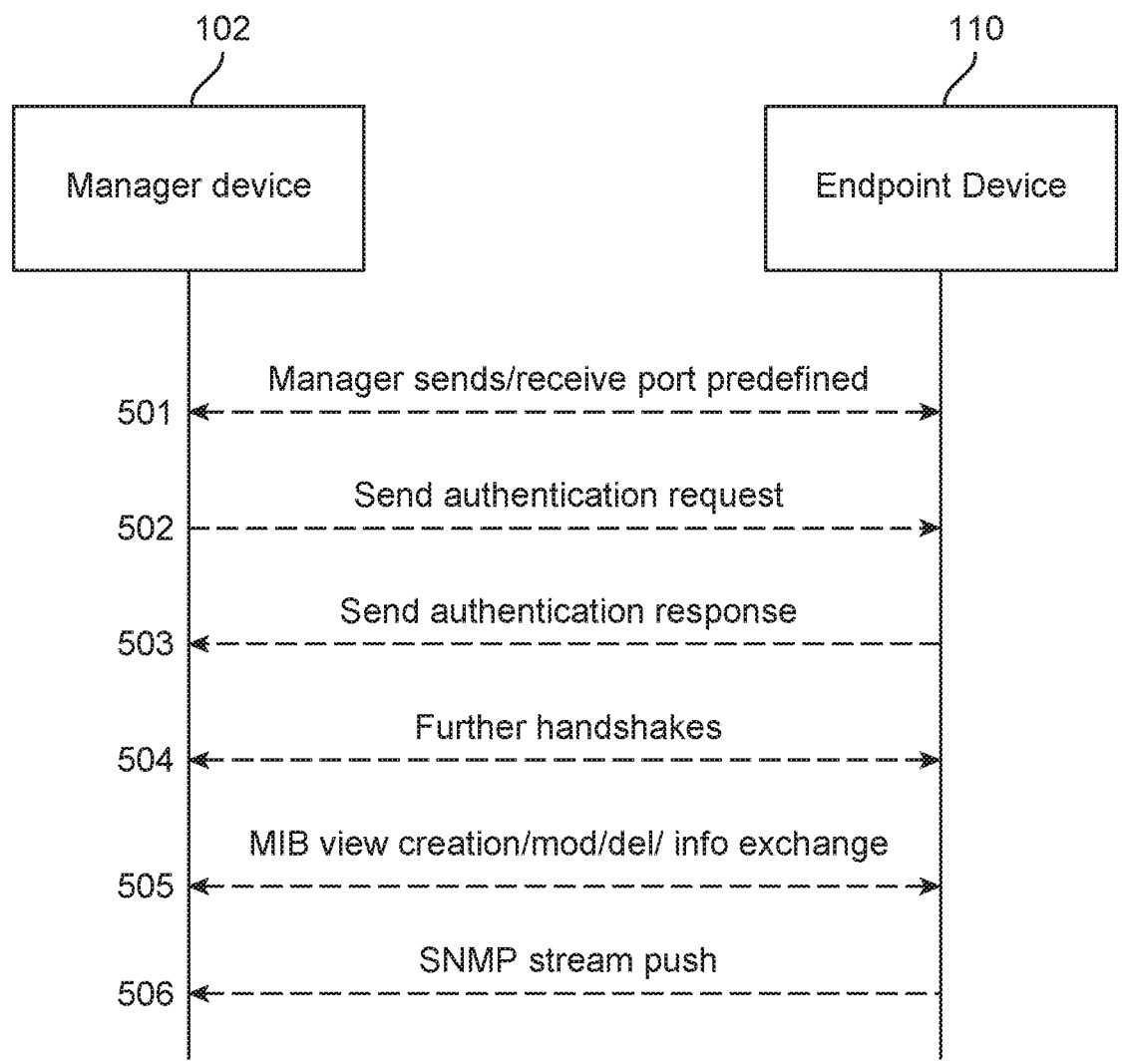
FIG. 5 illustrates a ladder diagram of the streaming method, according to one embodiment of the present subject matter.

The communication between the manager device and the endpoint device is depicted in a ladder diagram as illustrated in FIG. 5, according to one embodiment of the present subject matter. The manager device 102 may send and receive port predefined at 501. Next, the manager device and the endpoint device perform the authentication steps as described earlier at 502 and 503. In some embodiments, the authentication module may be reworked from SNMP agent code. The authentication may include further handshake operations 504 before any exchange of MIB data between the devices at 505 and the SNMP stream push at 506.

In various embodiments, the communication of MIB views consisting of MIB variables of interest between the endpoint device and the manager device takes place, at 504. At the endpoint device, views for MIB data are created and MIB data associated with that MIB view on the endpoint device are retrieved. The SNMP proxy is run on the endpoint device to store the MIB views along with the MIB data, compress the MIB views and the corresponding MIB data, and send the compressed MIB views along with the MIB data to the manager device 102. In some embodiments, the SNMP proxy may performs steps to run a SNMP command, such as snmpwalk—v 1-c public local host<mib sub-trees based on views>. On running the command, the SNMP proxy obtains the MIB views and the corresponding MIB data from the SNMP agent and stores the MIB views in a local data store 406. As described earlier, the SNMP proxy may periodically run the commands snmpwalk, get, getnext and then periodically obtain and store the views with corresponding MIB data in the local data store 406. In some embodiments, the SNMP proxy may obtain only full MIB sub-tree views with corresponding MIB data and create differential MIB sub-tree views with corresponding MIB data from the full MIB sub-tree views with corresponding MIB data. For instance, the SNMP proxy may create a difference between the previous data store and the current data based on the timestamp.

Further, the SNMP proxy compresses the MIB views with corresponding MIB data into a file. In some embodiments, the SNMP proxy may encrypt the compressed file prior to streaming the MIB views with the MIB data of sub-trees. The endpoint device may send the compressed full MIB view with the MIB data to the manager device in an initial stream. Further, the endpoint device may receive requests for MIB data at a later time. In some embodiments, the endpoint device 110 may automatically provide the compressed MIB file to the manager device even if a request has not been received. In various embodiments, the endpoint device may send the compressed MIB file to the manager device in a predetermined pattern or sequence. For example, the endpoint device may send a full MIB sub-tree in an initial stream, then send differential MIB sub-tree 'm' times in an interval period of N. On completion of the interval, the endpoint device may again send a full MIB sub-tree, then send differential MIB sub-tree 'm' times another interval period of N. In another embodiment, the sequence or pattern desired at the manager device may be sent to the endpoint device. In one embodiment, the method may include streaming compressed file of MIB views with corresponding MIB data associated with the full MIB sub-tree to the manager device in response to the occurrence of an event, such as an SNMP Trap. Essentially, the endpoint device 110 may send the MIB data whenever the manager device 102 requests for MIB data.

The endpoint device 110 may stream differential MIB views with the MIB data of the sub-trees. In various embodiments, the endpoint device 110 may encrypt the MIB data to prevent an adversary in the middle to mount an attack upon the streamed MIB data. Encryption techniques, such as AES algorithm may be used for compression is first applied to the data and then encryption atop it. For encryption a suitable method option and a password option may be provided that helps in key generation for the AES-192 or AES-256 encryption. Further, the text output of "snmpwalk" may be reconverted to TLVs that are proprietary to the product makers and then compression and encryption may be applied. The TLV format is easy to encode and decode. The decoding of the TLVs, decompression and decryption may be applied after the manager device receives the MIB data and stores it in a local data store 406. In various embodiments, the endpoint device may encrypt the data or information into custom or standard TCP and/or IP header fields. In another embodiment, the endpoint device may communicate with the manager device using data encoded in both TCP and/or IP header fields.

Figure 6:
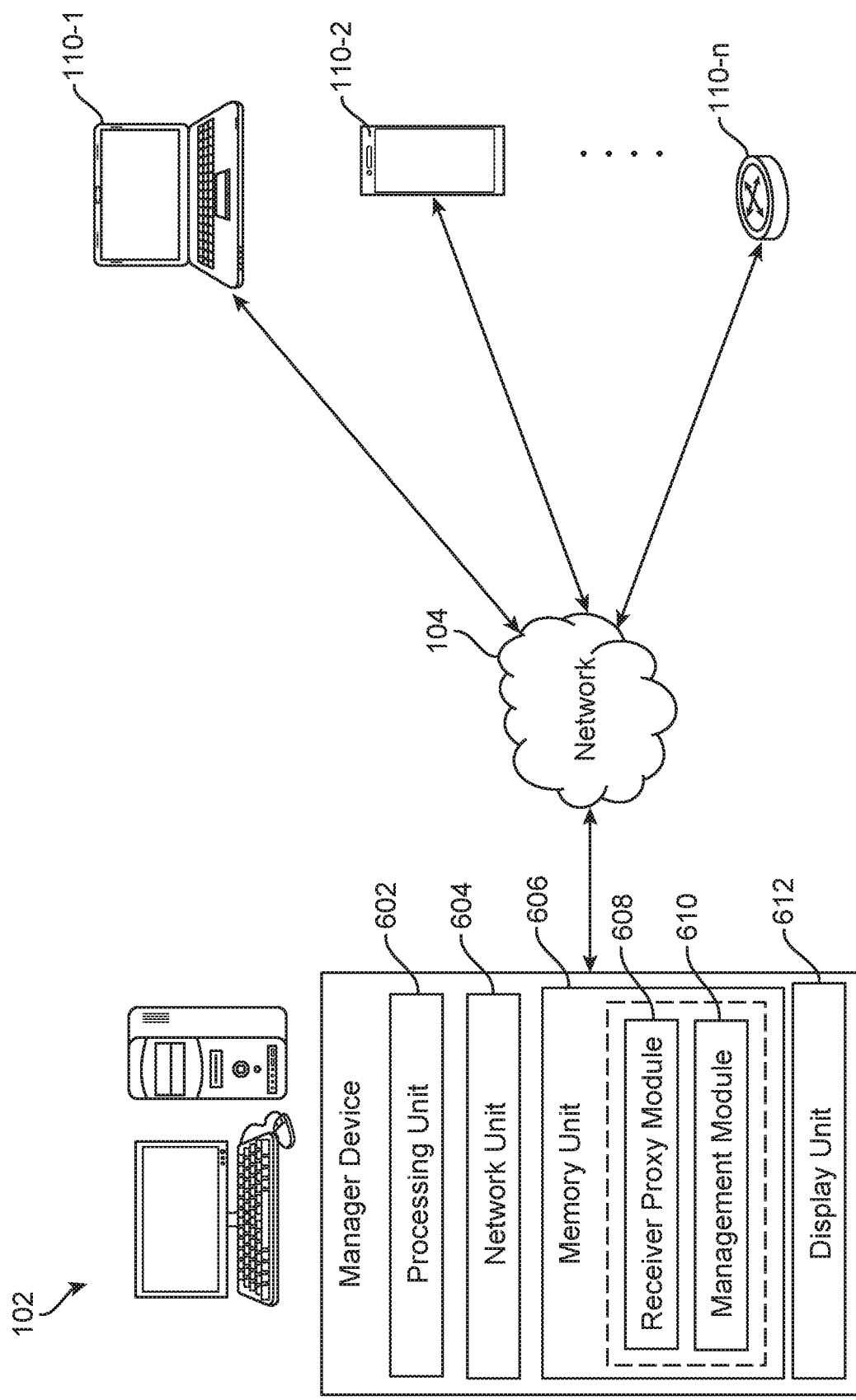
FIG. 6 illustrates a block diagram of the manager device, according to one example of the present subject matter.

An architecture of the manager device is illustrated in FIG. 6, according to one embodiment of the present subject matter. The manager device 102 may primarily include processing unit 602, network unit 604, memory unit 606 and display unit 612. The memory unit may include receiver proxy module 608 and management module 610. The receiver proxy module 608 may be configured to enable legacy manager devices to have the capability to receive and store the streamed SNMP data coming in from the SNMP proxy of the endpoint device 110. In various embodiments, the receiver proxy module 608 may be configured to listen on an appropriate UDP or TCP port to receive the streams of SNMP data—either as full SNMP sub-tree or as differential SNMP sub-tree. This receiver proxy may then store the data in a data store of the legacy network manager device.

The management module 610 may be configured to perform decompression and decryption of the received MIB data from the endpoint devices 110 in some embodiments. The decompressed and decrypted data may be in the format as follows:

Names of the MIB sub-trees on decompression and decryption:
    SNMPv2-MIB::sysORID.1=OID: SNMP-MPD-MIB::snmpMPDMIBObjects.3.1.1
    SNMPv2-MIB::sysORID.2=OID: SNMP-USER-BASED-SM-MIB::usmMIBCompliance
    SNMPv2-MIB::sysORID.3=OID: SNMP-FRAMEWORK-MIB::snmpFrameworkMIBCompliance
    SNMPv2-MIB::sysORID.4=OID: SNMPv2-MIB::snmpMIB
    SNMPv2-MIB::sysORID.5=OID: TCP-MIB::tcpMIB
    SNMPv2-MIB::sysORID.6=OID: IP-MIB::ip
    SNMPv2-MIB::sysORID.7=OID: UDP-MIB::udpMIB
    SNMPv2-MIB::sysORID.8=OID: SNMP-VIEW-BASED-ACM-MIB::vacmBasicGroup
    SNMPv2-MIB::sysORID.9=OID: SNMP-NOTIFICATION-MIB::snmpNotifyFullCompliance
    SNMPv2-MIB::sysORID.10=OID: NOTIFICATION-LOG-MIB::notificationLogMIB Scalar and table data of the MIB items on decompression and decryption:
    IF-MIB::ifNumber.0=INTEGER: 11
    IF-MIB::ifIndex.1=INTEGER: 1
    IF-MIB::ifIndex.2=INTEGER: 2
    IF-MIB::ifIndex.3=INTEGER: 3
    IF-MIB::ifIndex.4=INTEGER: 4
    IF-MIB::ifIndex.5=INTEGER: 5
    IF-MIB::ifIndex.6=INTEGER: 6
    IF-MIB::ifIndex.7=INTEGER: 7
    IF-MIB::ifIndex.8=INTEGER: 8
    IF-MIB::ifIndex.9=INTEGER: 9
    IF-MIB::ifIndex.10=INTEGER: 10
    IF-MIB::ifIndex.11=INTEGER: 11
    IF-MIB::ifDescr.1=STRING: lo0
    IF-MIB::ifDescr.2=STRING: gif0
    IF-MIB::ifDescr.3=STRING: stf0
    IF-MIB::ifDescr.4=STRING: en0
    IF-MIB::ifDescr.5=STRING: en1
    IF-MIB::ifDescr.6=STRING: fw0
    IF-MIB::ifDescr.7=STRING: en2
    IF-MIB::ifDescr.8=STRING: en3
    IF-MIB::ifDescr.9=STRING: p2p0
    IF-MIB::ifDescr.10=STRING: bridge0
    IF-MIB::ifDescr.11=STRING: utun0

The MIB views with their MIB data of the MIB sub-trees may be obtained based on the decompression and decryption and stored in a local data store 406 at the manager device 102. Further, the management module 610 may be configured to perform regular manager related operations, where the data may be used for generating charts and graphs. Therefore, legacy network management devices may also use the data store in this architecture to retrieve the MIB items to plot out the necessary information through the method that is already in adoption for processing and projecting the data in dashboards. The display unit 612 may be configured to display the generated charts and graphs associated with the MIB data.

Figure 7:
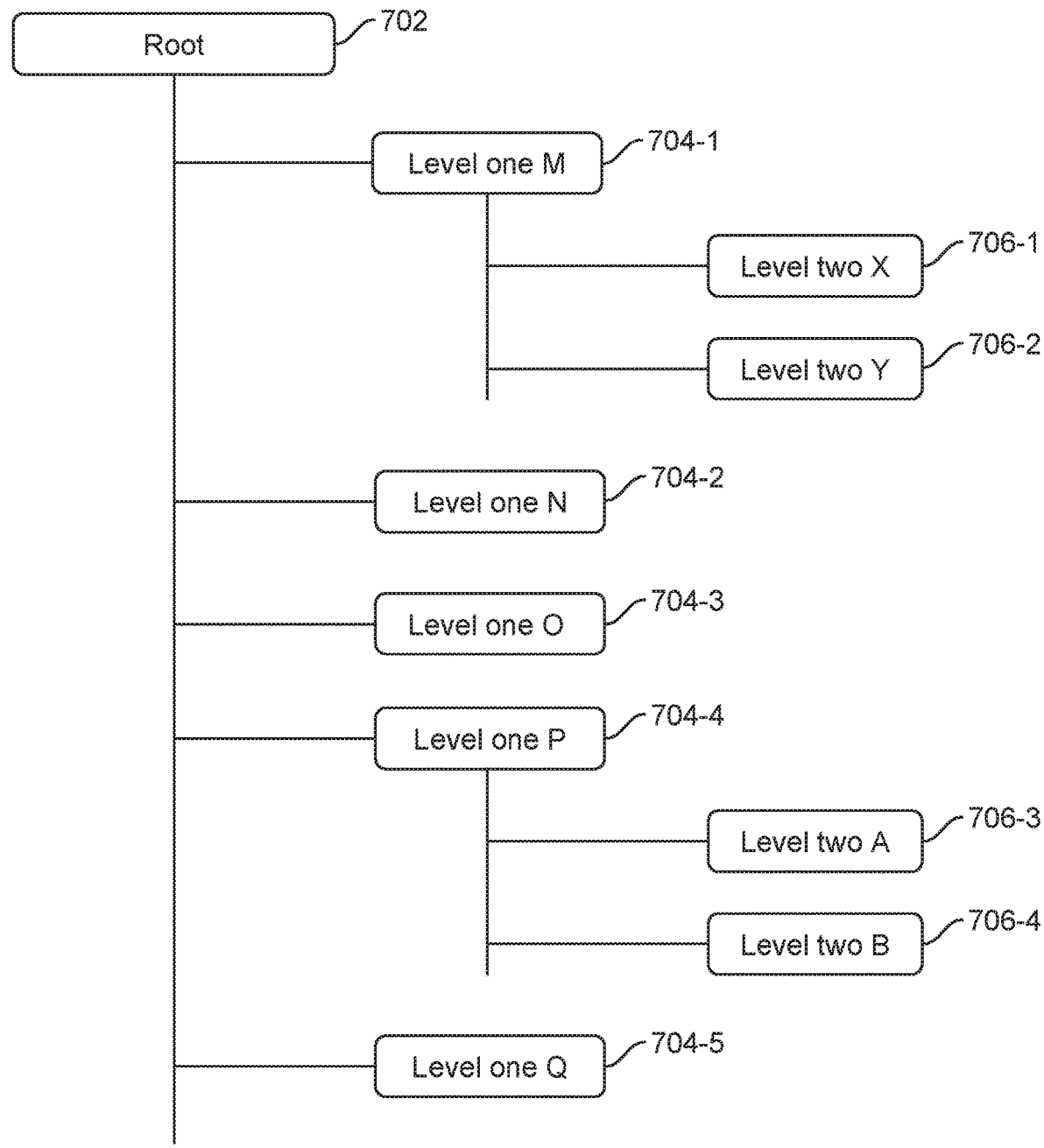
FIG. 7 illustrates a MIB tree structure, according to an example of the present subject matter.

An example MIB tree structure is illustrated in FIG. 7, according to one embodiment of the present subject matter. The MIB tree structure depicts an organized hierarchical representation of the MIB data with a plurality of levels. The MIB tree originates from a root 702, which may be extended further to branches or leaves, that are represented in different levels. As shown, the tree may branch out level one 704-N, some of which may further branch out to level two 706-N. Root level MIB object IDs (OIDs) may belong to different standard organizations. The whole MIB tree structure may be further processed and presented on a graphical user interface as MIB views with their corresponding MIB data. The MIB views consisting of the MIB variables of interest may be created by the SNMP proxy at the endpoint device and then the MIB data retrieved by the SNMP proxy.

In various embodiments, views may be disjoint comprising multiple sub-trees. For instance, differential MIB sub-trees may be depicted in disjoint views. In other embodiments, views may overlap (joint) with sub-trees repeating in several views, which offers flexibility to the manager device, is easy to implement and eliminates duplicates in data store. The MIB views may overlap (joint) with sub-trees repeating in several views. Such views offer flexibility to the manager device. The framework is easy to implement and duplicates in data store may be eliminated.

The above subject matter and its embodiments provide method and system for streaming MIB data using SNMP proxy. The streaming method utilizes lesser network bandwidth used as only differential MIB data (changes in MIB data) in a compressed format is transmitted. The method eliminates possibility of polling interval overlap and reducing the CPU cycles on manager devices. This increases the efficiency and lifecycle of the manger devices. Additionally, the polling time becomes irrelevant as the SNMP proxy polls the MIB data locally on the device. Further, encryption of the stream data ensures the security of the device data.

Although the detailed description contains many specifics, these should not be construed as limiting the scope of the invention but merely as illustrating different examples and aspects of the invention. It should be appreciated that the scope of the invention includes other embodiments not discussed herein. Various other modifications, changes and variations which will be apparent to those skilled in the art may be made in the arrangement, operation and details of the system and method of the present invention disclosed herein without departing from the spirit and scope of the invention as described here.

While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope.

What is claimed is:

1. A method of streaming Management Information Base (MIB) data using Simple Network Management Protocol (SNMP), the method comprising:
   receiving, by a plurality of endpoint devices, an authentication request from a manager device;
   sending, by each of the plurality of endpoint devices, an authentication response to the manager device, wherein the authentication response indicates an approval for communication;
   creating, at each endpoint device, MIB views based on a predetermined configuration, wherein the MIB views comprises MIB variables of interest;
   polling an SNMP agent locally on each endpoint device using a local SNMP request wherein the local SNMP request originates at each endpoint device;
   retrieving, by each endpoint device, MIB data associated with the endpoint device locally based on the MIB variables of interest, wherein the MIB data comprises a full MIB sub-tree and differential MIB sub-trees;
   storing the MIB views with the corresponding MIB data on a local data store at each endpoint device;
   compressing, by each endpoint device, the MIB views with the corresponding MIB data associated with full MIB sub-tree and differential MIB sub-trees into files;
   sending, by the endpoint devices, the compressed files of the MIB view associated with full MIB sub-tree to the manager device in an initial stream;
   receiving, by the endpoint devices, requests for updated MIB views from the manager device; and
   streaming compressed file of the MIB views with the corresponding MIB data associated with the differential MIB sub-tree to the manager device.

2. The method of claim 1, wherein the full MIB-sub-tree comprises all MIB data associated with the endpoint device and the differential MIB-sub-tree comprises differences in the full MIB sub-tree over different time period.

3. The method of claim 1 further comprising receiving the predetermined configuration from the manager device prior to creating MIB views.

4. The method of claim 1 further comprising determining a differential MIB-sub-tree by differentiating full MIB-sub-tree obtained at $t_n$ from the full MIB-sub-tree obtained at $t_{n-1}$.

5. The method of claim 1 further comprising streaming compressed file of MIB views with corresponding MIB data associated with the full MIB sub-tree in response to receiving a request for updated MIB views comprising MIB variables of interest for full MIB sub-tree from the manager device.

6. The method of claim 1 further comprising streaming compressed files of both MIB views with the corresponding MIB data associated with the full MIB-sub-tree and differential MIB-sub-tree in a predetermined sequence, wherein the predetermined sequence is provided by the manager device.

7. The method of claim 1 further comprising streaming compressed file of MIB views with corresponding MIB data associated with the full MIB sub-tree to the manager device in response to the occurrence of an event, wherein the event is a SNMP Trap.

8. The method of claim 1 further comprising encrypting the compressed file prior to streaming the compressed file associated with the MIB views with corresponding MIB data of differential MIB sub-tree.

9. The method of claim 1, wherein transport mechanism used in the streaming comprises one of UDP or TCP.

10. The method of claim 1, wherein the local data store stores the MIB views of the latest MIB data retrieved.

11. The method of claim 1, wherein the request for MIB views from the manager device comprises one or more MIB variables of interest.

12. A system for streaming Management Information base (MB) data using Simple Network Management Protocol (SNMP), the system comprising:
a manager device configured to manage devices over a network;
a plurality of endpoint devices connected to the network, wherein the endpoint devices comprise:
  a processing unit;
  a memory unit comprising a plurality of modules to be executed by the processing unit, wherein the plurality of modules comprises:
    an authentication module configured to:
      receive an authentication request from the manager device; and
      send an authentication response to the manager device, wherein the authentication response indicates an approval for communication;
    a SNMP proxy module configured to:
      create MIB views based on a predetermined configuration, wherein the MIB views comprises MIB variables of interest;
      poll an SNMP agent module locally on each endpoint device using a local SNMP request, wherein the local SNMP request originates at each endpoint device;
      retrieve MIB data from the SNMP Agent module associated with the endpoint device locally based on the MIB variables of interest, wherein the MIB data comprises a full MIB sub-tree and differential MIB sub-trees;
      store the MIB views with the corresponding MIB data on a local data store at each endpoint device, wherein the local data store is configured to store the MIB views with corresponding MIB data periodically;
      compress the MIB views with corresponding MIB data associated with full MIB sub-tree and differential MIB sub-trees into files;
      send the MIB views with corresponding MIB data associated with full MIB subtree to the manager device in an initial stream;
      receive requests for updated MIB views from the manager device; and
      stream the compressed file of the MIB views with corresponding MIB data associated with the differential MIB sub-tree to the manager device.

13. The system of claim 12, wherein the manager device comprises, a memory unit, a display unit for displaying the streamed MIB views and MIB data and a processor unit for processing the received data.

14. The system of claim 13, wherein the memory unit comprises a receiver proxy module configured to receive and store the SNMP data streamed from the SNMP proxy of the endpoint device.

15. The system of claim 13, wherein the memory unit comprises management module configured to generate charts and graphs associated with MIB views and corresponding MIB data.

16. The system of claim 12, wherein the SNMP proxy module is configured to encrypt the compressed file prior to streaming the MIB views with the corresponding MIB data of full and differential MIB sub-tree.

17. The system of claim 12, wherein full MIB-sub-tree comprises all MIB data associated with the endpoint device and the differential MIB-sub-tree comprises differences in the full MIB sub-tree over different time period.

18. The system of claim 12, wherein the SNMP proxy module is configured to determine a differential MIB-sub-tree by differentiating full MIB-sub-tree obtained at $t_n$ from the full MIB-sub-tree obtained at $t_{n-1}$.

19. The system of claim 12, wherein the SNMP proxy module is configured to stream compressed files of MIB views with the corresponding MIB data associated with the full MIB sub-tree in response to receiving a request for full MIB sub-tree from the manager device.

20. The system of claim 12, wherein the SNMP proxy module is configured to stream compressed files of both MIB views with corresponding MIB data associated with the full MIB-sub-tree and differential MIB-sub-tree in a predetermined sequence, wherein the predetermined sequence is provided by the manager device.

21. The system of claim 12, wherein the SNMP proxy module receives the request for MIB views from the manager device, the request comprising one or more MIB variables of interest.

* * * * *